Figure 9:
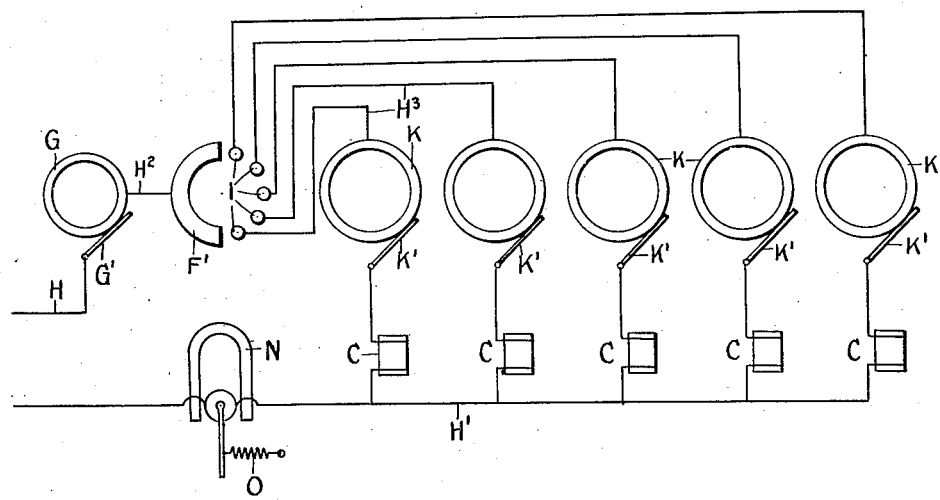

J. G. ACEVES.
SPEED CONTROLLER.
APPLICATION FILED MAR. 24, 1915.
1,190,839.
Patented July 11, 1916.
3 SHEETS—SHEET 1.
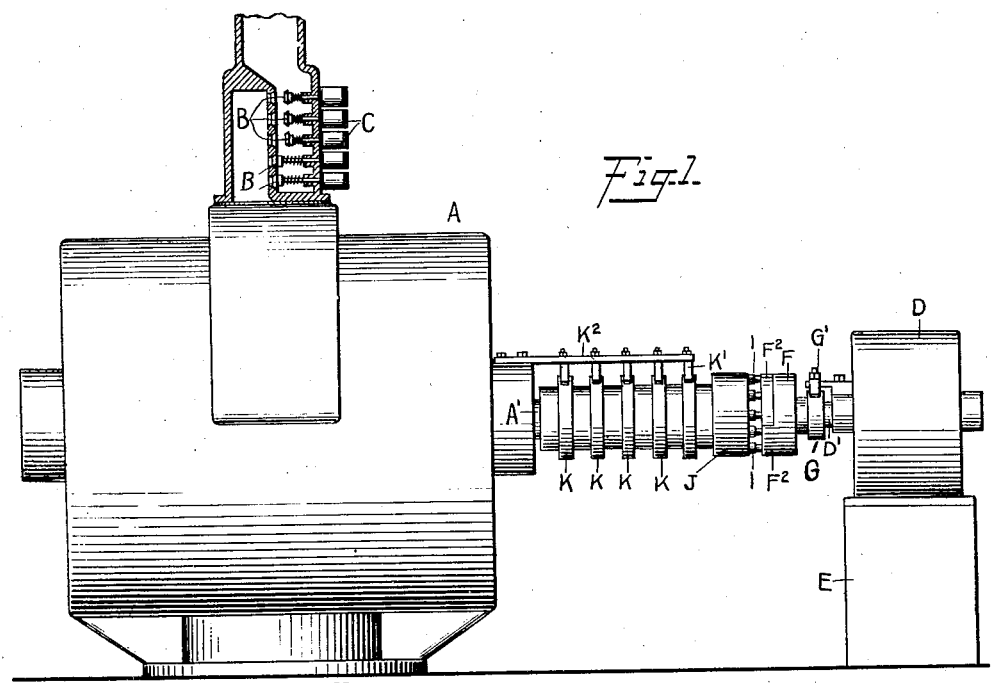
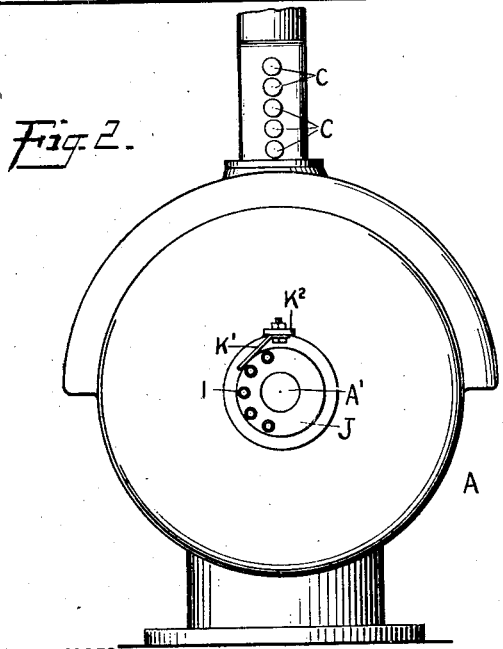
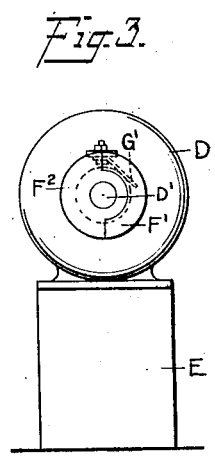
WITNESSES
INVENTOR
Julius G. Aceves
BY
ATTORNEYS

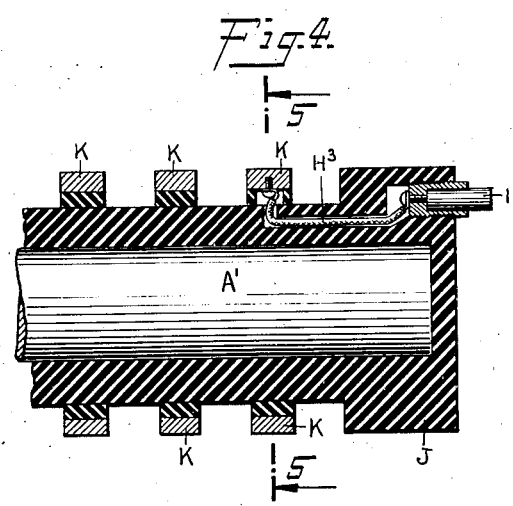
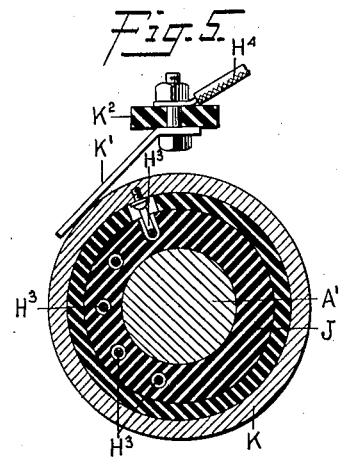
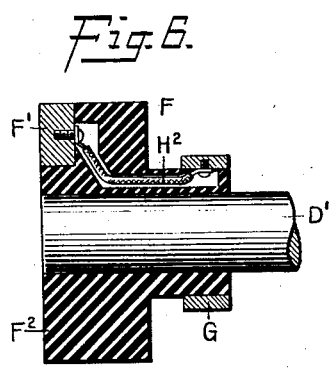
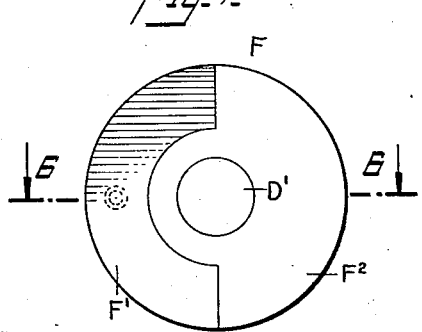
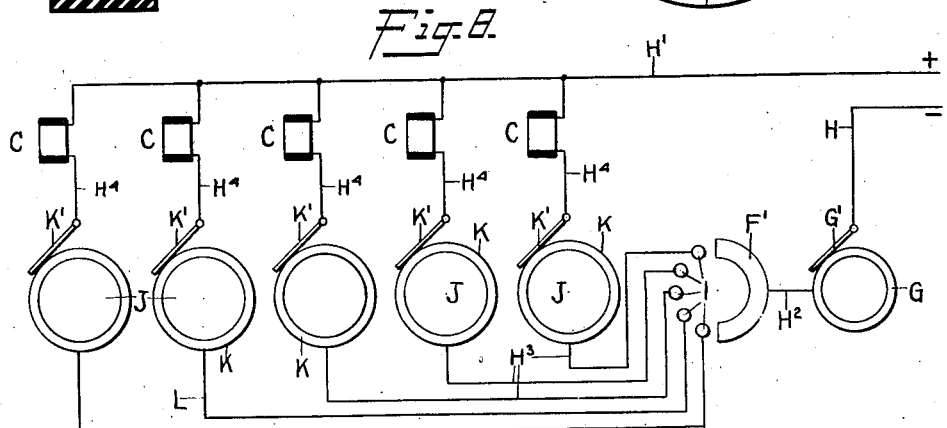

UNITED STATES PATENT OFFICE.

JULIUS GOURGUES ACEVES, OF NEW YORK, N. Y.

SPEED-CONTROLLER.

1,190,839.

Specification of Letters Patent. Patented July 11, 1916.

Application filed March 24, 1915. Serial No. 16,788.

*To all whom it may concern:*

Be it known that I, JULIUS G. ACEVES, a citizen of the Republic of Mexico, at present residing in the city of New York, borough of Manhattan, in the county and State of New York, have invented a new and Improved Speed-Controller, of which the following is a full, clear, and exact description.

The object of the invention is to provide a new and improved speed controller more especially designed for use on prime movers such as steam and gas engines, water wheels, turbines and the like, and arranged to cause the controlling devices of the prime mover to vary with a view to maintain the speed of the prime mover equal to that of a small pilot motor running at any desired speed.

In order to accomplish the desired result, use is made of a pilot motor and a controlling device connected with the prime mover for controlling the speed thereof, the said controller being governed by the said pilot motor.

A practical embodiment of the invention is represented in the accompanying drawings forming a part of this specification, in which similar characters of reference indicate corresponding parts in all the views.

Figure 1 is a side elevation of the speed controller as applied to a steam turbine; Fig. 2 is an end view of the prime mover; Fig. 3 is a similar view of the pilot motor; Fig. 4 is an enlarged sectional side elevation of a part of the controller attached to the shaft of the prime mover; Fig. 5 is a cross section of the same on the line 5—5 of Fig. 4; Fig. 6 is an enlarged sectional plan view of the controller attached to a shaft driven by the pilot motor, the section being on the line 6—6 of Fig. 7; Fig. 7 is an end elevation of the same; Fig. 8 is a diagrammatic view of the speed controller as applied to a steam turbine; and Fig. 9 is a similar view of the speed controller as applied to an internal combustion engine.

The speed controller, as shown in Fig. 1, is applied to a prime mover A in the form of a turbine having a plurality of admission valves B for controlling the admission of the motive agent to the prime mover A. The valves B are individually controlled by electro-magnets C which when energized open the valves and when deënergized allow the valves to close. A pilot motor D of any approved construction is mounted on a foundation E adjacent the prime mover A and the axis of the shaft D' of the pilot motor D coincides with the axis of the shaft A' of the prime mover A. On the shaft D' or on any other shaft driven from the shaft D' is secured a commutator F formed of two parts F', F$^2$, of which the part F$^2$ is of a suitable insulating material, while the section F' is segmental and is of an electric conducting material. The part F$^2$ is secured on the shaft D' and carries a ring G engaged at its peripheral face by a brush G' connected with a wire H of an electric circuit connected with a suitable source of electrical energy. A line wire H' connects with the electro-magnets C above mentioned (see Fig. 1). The ring G is connected by a wire H$^2$ with the part F$^2$ of the commutator F and the face of the commutator F is engaged by a series of brushes I arranged in a circle and mounted on a commutator J of a suitable insulating material and secured on the shaft A' or any other shaft driven by the prime mover A. The brushes I are connected by wires H$^3$ with commutator rings K mounted on the commutator J, and the rings are engaged by brushes K' held on an insulating support K$^2$ preferably attached to the casing of the prime mover A. The brushes K are connected by wires H$^4$ with the electro-magnets C.

The operation is as follows: When the prime mover A and the pilot motor D are running at the same normal speed, then a number of brushes I (say three) are in contact with the part F' of the commutator F, while the remaining two brushes are in contact with the part F$^2$. The electric circuit for the three brushes I in engagement with the part F' is now closed by way of the commutator rings K, brushes K', wires H$^4$, electromagnets C, wire H', electrical source of energy, wire H, brush G', ring G and wire H$^2$ connected with the part F'. The three corresponding electro-magnets C are thus energized and hold their valves B in open position to allow the motive agent to pass into the prime mover A to rotate the same at a normal speed. In case the prime mover A tends to move at a higher rate of speed than the pilot motor D then one or more of the active brushes I move out of engagement with the conducting part F' and into engagement with the non-conducting part F$^2$ whereby the corresponding electro-magnets C are cut out, that is, deënergized to allow their valves B to close thus reducing the admission of the motive agent to the prime mover A to reduce the propelling force and maintain perfect dynamic equilibrium between the driving torque and the load. In case the prime mover A runs at a speed lower than the normal speed then one or both brushes in engagement with the part F² move into engagement with the part F' so that the corresponding electromagnets C are energized thereby opening additional valves B to admit more motive agent to the prime mover A, thereby increasing the driving torque of the latter until dynamic equilibrium is reached.

From the foregoing it will be seen that by the arrangement described the controlling means of the prime mover A are governed by the speed controller to cause the prime mover A to run at the same speed of the pilot motor irrespective of the load.

The speed controller as applied to an internal combustion prime mover may be made to control in a similar manner the time of the spark or the gaseous mixture or both. As shown, for instance, in Fig. 9, the speed controller is arranged to control directly the amount of fuel gas that mixes with the air prior to the admission of the explosive mixture to the cylinders, and the speed controller also controls the ignition of the explosive mixture. In this case the electro-magnets C control the admission valve for the fuel gas and a magnet N of suitable design is inserted in series with the valve magnets C. The object of the magnet N is to vary the time of ignition on pulling the controlling lever of the engine. The more current passes through the magnet N, when more valves are opened, the stronger it will pull the lever against the spring O, causing a retardation of the spark as the mixture gets richer, and conversely, when the number of open valves diminishes, the spark will be advanced so as to bring at all times the maximum thermal efficiency. From the above, I believe, could be claimed that this type of governor causes the engine to work at highest efficiency at all loads. Another feature applying to regulators for all types of movers (being either gas, water or steam turbines or engines) is that for a central station in which these movers operate alternating current generators, the synchronizing devices can be omitted, as the pilot motors may be all of them synchronous motors fed from a source of constant frequency A. C. or directly from the main A. C. line of the station. Furthermore, it will reduce practically to nothing the local wattless currents exchanged between generators of alternating currents produced by the different inherent characteristics of speed regulation with varying load of each of the different prime movers of a central station or system of central stations connected together. The speed controller may also be made to operate upon any one of the existing types of governor with a view to replace the centrifugal force element which causes such governor to operate.

By the use of the speed controller a plurality of prime movers of a diversity of types may be held in strict synchronism with each other and with a given source of alternating current which operates a number of synchronous pilot motors which control the speed of the prime movers by means of the speed controller.

Having thus described my invention, I claim as new and desire to secure by Letters Patent:

1. In a speed controller for prime movers, means for controlling the admission of the motive agent to said prime mover, a pilot motor, and an electric controlling device directly connected with the admission means for controlling the same, the said controlling device being governed by the said pilot motor.

2. In a speed controller for prime movers having controlling means, a pilot motor, an electric controlling device controlling directly the controlling means of the said prime mover, the said controlling device being influenced on a relative angular displacement between rotating elements of the prime mover and the pilot motor to vary the controlling means of the prime mover.

3. In a speed controller for prime movers having controlling means, a pilot motor, a controlling device having controlling members of which one is driven by a rotatable part of the prime mover and the other is driven by a rotatable part of the pilot motor, one of the said controlling members having a suitable commutator and the other controlling member having a series of contact brushes, a certain number of said brushes engaging the contact surface of the said commutator when the prime mover and the pilot motor are running at the same normal speed, the number of brushes in contact varying as the speed of the prime mover varies from the normal, and actuating devices for the controlling means of the prime mover and connected with the said series of contact brushes.

4. In a speed controller for prime movers, a pilot motor, electric actuating means for directly actuating the controlling devices of the said prime mover, and means for controlling the said actuating devices from the said pilot motor on a tendency of variation of relative speed of the prime mover with respect to the pilot motor to bring a greater or less number of the controlling devices of the prime mover into action.

5. In a speed controller for prime movers having controlling valves, electro-magnets for individually and directly controlling said valves, a pilot motor, a controlling device connected with the prime mover, for controlling said electromagnets, the said controlling device being governed by the said pilot motor to bring a greater or less number of electromagnets into action.

6. In a speed controller for prime movers, means for controlling the driving of the said prime mover including supply valves for the prime mover, electromagnets for individually and directly controlling said valves, means carried by a rotating element of the prime mover for energizing said electromagnets and a pilot motor for controlling said energizing means.

7. In a speed controller for prime movers, having controlling valves, electromagnets for individually controlling said valves, a pilot motor, a commutator driven by the prime mover and having a series of commutator rings each electrically connected with an electromagnet, a series of contact brushes mounted on said commutator and connected respectively with the said commutator rings, and a commutator carried by the pilot motor and connected with the electro-magnets, the said commutator having a contact surface adapted to be engaged by the said brushes to energize the electromagnets to open the valves, sundry of the said brushes being moved into or out of engagement with the said commutator as the speed of the prime mover varies from that of the pilot motor.

8. In a speed controller for prime movers, a pilot motor, supply valves for the prime mover, electromagnets for directly controlling said valves, a series of commutator elements carried by a rotatable part of the prime mover, a commutator carried by a rotatable part of the pilot motor, a series of contact brushes carried by the rotatable part of the prime mover, the said brushes being adapted to engage the commutator carried by the pilot motor, and electrical connections between the said electromagnets and the commutator elements of the prime mover and the commutator of the pilot motor, a relative angular displacement between the rotating parts of the prime mover and the pilot motor, increasing or decreasing the number of electromagnets energized and valves actuated.

In testimony whereof I have signed my name to this specification in the presence of two subscribing witnesses.

JULIUS GOURGUES ACEVES.

Witnesses:
GEORGE J. GILLESPIE,
GERTRUDE V. KELLY.